(12) United States Patent
Brice

(10) Patent No.: US 12,611,980 B2
(45) Date of Patent: Apr. 28, 2026

(54) MULTI-PURPOSE UTILITY TRAILER

(71) Applicant: Cody Brice, Lafayette, LA (US)

(72) Inventor: Cody Brice, Lafayette, LA (US)

( * ) Notice: Subject to any disclaimer, the term of this patent is extended or adjusted under 35 U.S.C. 154(b) by 315 days.

(21) Appl. No.: 18/196,982

(22) Filed: May 12, 2023

(65) Prior Publication Data

US 2023/0365049 A1 Nov. 16, 2023

Related U.S. Application Data

(60) Provisional application No. 63/341,183, filed on May 12, 2022.

(51) Int. Cl.
B60P 3/34 (2006.01)

(52) U.S. Cl.
CPC ................................... B60P 3/341 (2013.01)

(58) Field of Classification Search
CPC .... B60P 3/341; B60P 3/42; B60P 3/10; B60P 3/04; B60J 5/14; B60J 5/08; B62D 63/061
USPC ......... 296/186.2, 182.1, 181.1, 181.7, 26.01, 296/26.04, 26.05
See application file for complete search history.

(56) References Cited

U.S. PATENT DOCUMENTS

| | | |
|---|---|---|
| 3,321,233 A | 5/1967 | Davis |
| 3,360,294 A | 12/1967 | Cieslak |
| 3,394,961 A | 7/1968 | Matte |
| 3,458,232 A | 7/1969 | Frank |
| 3,514,148 A * | 5/1970 | Hunter .................... B60P 3/341 |
| | | 296/26.02 |
| 3,582,129 A | 6/1971 | Frank |
| 3,622,193 A | 11/1971 | Schmidt |
| 3,629,884 A | 12/1971 | Brown |
| 3,875,953 A | 4/1975 | Couix |
| 3,913,968 A | 10/1975 | Luppens |
| 4,057,284 A | 11/1977 | Blank |
| 4,188,056 A * | 2/1980 | Watson .................. B62D 63/08 |
| | | 296/157 |
| 4,420,165 A | 12/1983 | Goodin |
| 4,784,429 A | 11/1988 | Hodges |
| 5,002,325 A * | 3/1991 | Fought ................. B60K 15/063 |
| | | 280/830 |
| 5,080,426 A | 1/1992 | Johnson |
| 5,143,417 A | 9/1992 | Philley et al. |
| 5,505,514 A | 4/1996 | Green |

(Continued)

FOREIGN PATENT DOCUMENTS

| | | | |
|---|---|---|---|
| AU | 200126437 B2 | 9/2001 | |
| WO | WO-2021038546 A1 * | 3/2021 | ............ B60P 1/6427 |

*Primary Examiner* — Amy R Weisberg
*Assistant Examiner* — Veronica M Condo
(74) *Attorney, Agent, or Firm* — McCutcheon Joseph, PLLC

(57) ABSTRACT

A modular, multi-purpose trailer comprises a base, a roof, a plurality of support columns, and walls which can detach from the base and withdraw to an open position within or adjacent to the roof, exposing the interior of the trailer. This withdrawal may be accomplished by means of nested segments sliding up the support columns, rolling mechanisms raising semi-flexible walls, or support columns comprising hydraulic cylinders. This permits the trailer to be used for both open-air functions such as hauling vehicles or livestock transports and closed functions such as camping by re-attaching the walls to the base.

14 Claims, 12 Drawing Sheets

(56)  References Cited

U.S. PATENT DOCUMENTS

| | | | | |
|---|---|---|---|---|
| 5,505,515 | A * | 4/1996 | Turner | B60P 3/341 |
| | | | | 296/26.05 |
| 5,911,467 | A * | 6/1999 | Evans | B60J 5/067 |
| | | | | 296/100.15 |
| 6,604,777 | B2 | 8/2003 | Neville | |
| 6,663,167 | B2 * | 12/2003 | Phillips | B60P 3/341 |
| | | | | 296/100.1 |
| 6,890,020 | B2 * | 5/2005 | Bush, Sr. | B62D 33/02 |
| | | | | 296/186.4 |
| 7,014,238 | B2 * | 3/2006 | Gonzalez | B60P 1/02 |
| | | | | 296/26.05 |
| 7,125,068 | B2 * | 10/2006 | Waldorf | B60P 1/00 |
| | | | | 296/182.1 |
| 7,189,042 | B1 * | 3/2007 | Schmit | B60P 7/0823 |
| | | | | 410/97 |
| 7,243,965 | B2 * | 7/2007 | King | B60J 7/1614 |
| | | | | 296/26.06 |
| 7,246,844 | B2 | 7/2007 | Guidry | |
| D566,624 | S | 4/2008 | Dempsey et al. | |
| 7,789,452 | B2 * | 9/2010 | Dempsey | B60P 3/42 |
| | | | | 296/173 |
| 7,815,015 | B2 * | 10/2010 | Kerns | A01M 31/025 |
| | | | | 296/26.05 |
| 8,439,426 | B2 | 5/2013 | Dempsey et al. | |
| 8,596,707 | B2 * | 12/2013 | Fiander | B60P 3/36 |
| | | | | 296/99.1 |
| D706,684 | S | 6/2014 | Dempsey et al. | |
| 10,414,322 | B1 * | 9/2019 | Coulter | B62D 63/064 |
| 2006/0033358 | A1 | 2/2006 | Guidry | |
| 2011/0101728 | A1 * | 5/2011 | Bourcier | B60J 7/102 |
| | | | | 296/100.18 |
| 2013/0241176 | A1 * | 9/2013 | Dempsey | B60P 3/42 |
| | | | | 135/88.13 |
| 2017/0240088 | A1 | 8/2017 | Tait | |
| 2017/0240089 | A1 | 8/2017 | Tait | |

* cited by examiner

MULTI-PURPOSE UTILITY TRAILER

REFERENCE TO RELATED APPLICATIONS

This is a utility patent application claiming benefit of and priority to provisional application No. 63/341,183, filed 12 May 2022, with the title "Multi-Purpose Utility Trailer." The contents of the above-referenced provisional application are incorporated herein by reference.

FIELD

The invention is in the field of transportation, specifically, a utility trailer having a modular structure capable of swapping out at attachment points for recreational living, hauling of boats and vehicles, and livestock.

BACKGROUND

Currently, most trailers are purpose-built for a specific application, such as camper trailers for outdoor living or livestock trailers for hauling livestock. Retrofitting one type of trailer to perform the function of another is expensive and impractical, while trailers which perform multiple functions are much larger and limited in scope.

Some trailers utilize moveable parts to switch between functions. An example of such a prior art trailer is U.S. Pat. No. 5,505,514 to Green, which discloses a combination camper/trailer utilizing a vehicle frame adjacent to a utility trailer. The vehicle frame is partially contained underneath the camper portion and can scope out to extend the length of the trailer depending on whether the user wishes to transport a small vehicle (e.g., an all-terrain vehicle) or a large vehicle (e.g., a boat). However, the camper function itself cannot be removed to save space, and in the max-length configuration, the camper can still be unwieldy to transport.

A need therefore exists for a modular trailer which can save both space and expense by performing multiple functions, such as providing living space for campers, contained transport for livestock, vehicle hauling, and other utilities, without expanding the "footprint" of the trailer on the road in order to accommodate these multiple functions.

Embodiments described within the present disclosure meet these needs.

SUMMARY

A trailer vehicle is disclosed comprising a framework supporting a roof, the roof housing a collapsible watertight shell which can be stored therein. When it is desired to enclose the trailer for use as camping quarters, the collapsible watertight shell can scope down to the bottom of the framework and isolate the environment from the outdoors. When it is desired to leave the trailer open (e.g., for transport), the collapsible watertight shell retracts upwards into the roof and the framework is available as a trailer bed for vehicles, etc.

Detailed embodiments are described below with respect to one of the above-listed figures.

DETAILED DESCRIPTION

Before describing selected embodiments of the present disclosure in detail, it is to be understood that the present invention is not limited to the embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

Figures 1A, 1B:
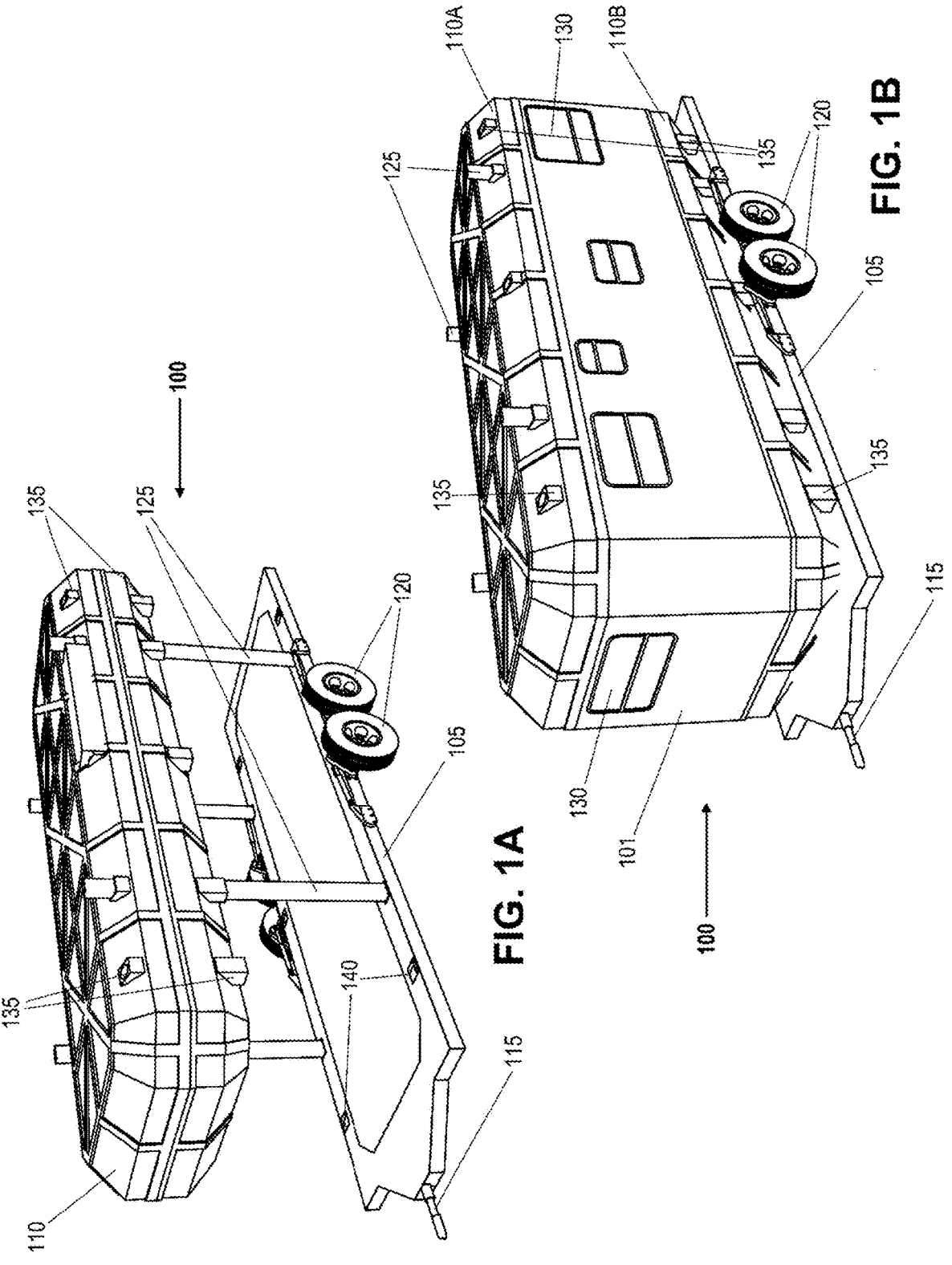
FIGS. 1A and 1B depict an embodiment of the trailer with the collapsible shell open and closed.

Turning first to FIGS. 1A and 1B, an embodiment of the trailer 100 is shown with the collapsible shell 101 fully withdrawn in FIG. 1A, and frilly lowered in FIG. 1B. The trailer 100 comprises a base frame 105 and a roof 110 comprising an upper portion 110A and a lower portion 110B. A standard multi-axis trailer hitch 115 connects the trailer 100 to a towing vehicle and a plurality of axel-less wheel and tire assemblies 120 provide basic towing function. In an embodiment, the roof 110 play comprise solar panels operably connected to via wiring conduits (as further described below).

The trailer further comprises support columns 125 which can be made of square, round, or rectangular steel, composite, or PVC tubing. In an embodiment, the support columns 125 and base frame 105 are hollow and can be used for air circulation, for electrical wiring, or for water storage (potable, grey, or black water). The depicted embodiment in FIGS. 1A-1B is shown having four support columns 125 (only two labeled in each drawing for clarity), however, embodiments may be constructed with more or less support columns depending on the size of the trailer. In a further embodiment, the electrical wiring may comprise sensors or video connections for contact alarms and/or external surveillance of the trailer.

Electric or plumbing functions may additionally be performed by a plurality of collapsible tubes 135, which interface with attachment points 140 located on the base frame 105. For instance, the support columns 125 may house electrical wiring while the collapsible tubes 135 circulate water. The embodiment is depicted in FIGS. 1A-1B having six collapsible tubes 135 abutting six corresponding attachment points 140, however as with the support columns 125, the number may be more or less depending on size and functionality.

In various embodiments, the collapsible shell 101 may comprise a "rolling" wall similar to those seen in storage units and garage doors, which may be layered with insulating material and/or sealing material to enhance the protective capability. The collapsible shell 101 may comprise a plurality of small plastic windows 130 made up of a pliable material (e.g., a composite material capable of bending up to 90 degrees over a 4 foot distance) and therefore capable of rolling and/or folding with the collapsible shell 101 while scoped into the roof 110.

In another embodiment, the collapsible shell 101 may comprise "nesting" sliding walls in which vertically adjacent segments of the wall extend downward from a stored position in the roof 100. These walls may comprise aluminum, steel (including stainless steel), HDPE and other composites, or combinations thereof.

The embodiment depicted in FIGS. 1A-1B can thus function as a trailer or a camper depending on whether the collapsible shell 101 is scoped "up" or "down" from the roof 110. When scoped up, vehicles can be attached to the base frame 105 using the attachment points 140 or other attachment points for specific sizes. When scoped down, the collapsible shell 101 provides protection and insulation for use as a temporary living space.

Figures 2A, 2B:
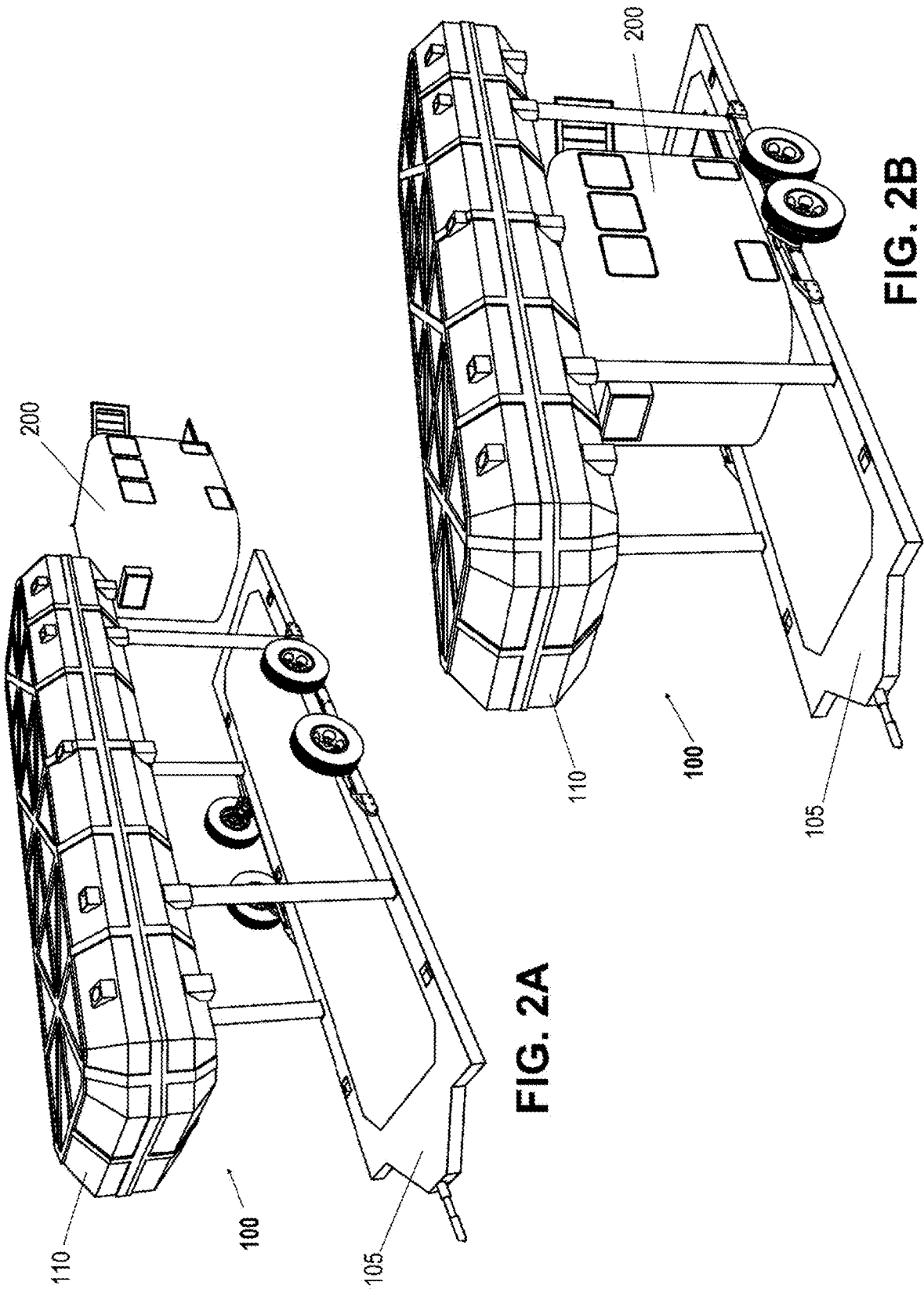
FIGS. 2A and 2B depict an embodiment of the trailer configured for use with a livestock transport.

Turning now to FIGS. 2A-2B, the modular function of an embodiment of the trailer 100 is further demonstrated by housing a livestock transport 200. The livestock transport 200 can slide onto the trailer base frame 105 and utilize the attachment points 140 or custom attachments (not shown). Since the livestock transport 200 is substantially shorter than the trailer 100, the remainder of the base frame 105 may be further utilized for small vehicle storage or carrying feed.

Figure 3:
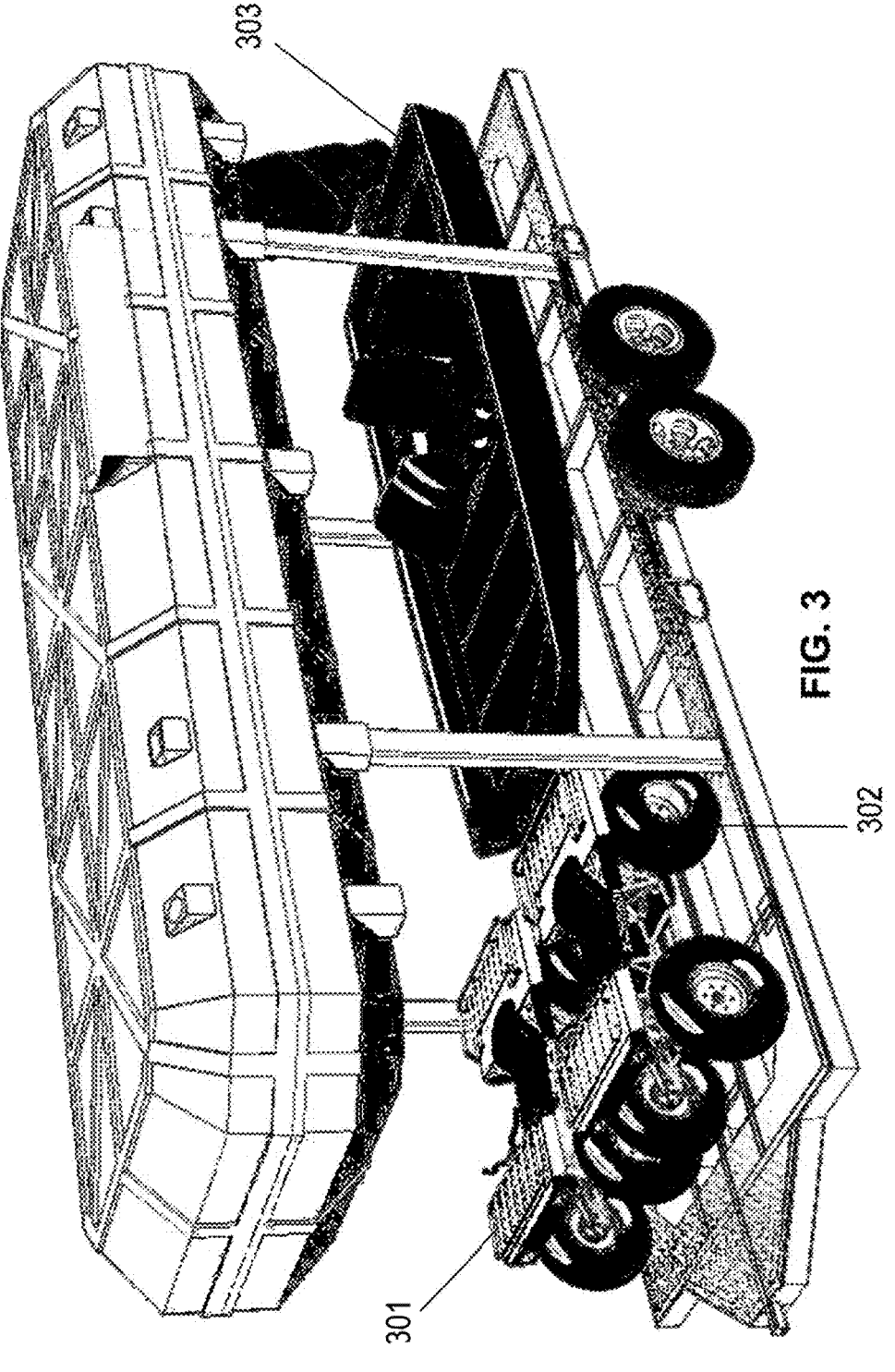
FIG. 3 depicts an embodiment of the trailer with the collapsible shell open for use as a vehicle hauler.

Turning now to FIG. 3, an embodiment of the trailer 100 is shown with the collapsible shell 101 fully scoped up (thus not visible) for use as a transport for vehicles 301-303 in FIG. 3. FIG. 3 shows a configuration with two all-terrain vehicles and a boat, with the base frame 105 comprising multiple attachment points (not shown) in an internal framework.

Figure 4:
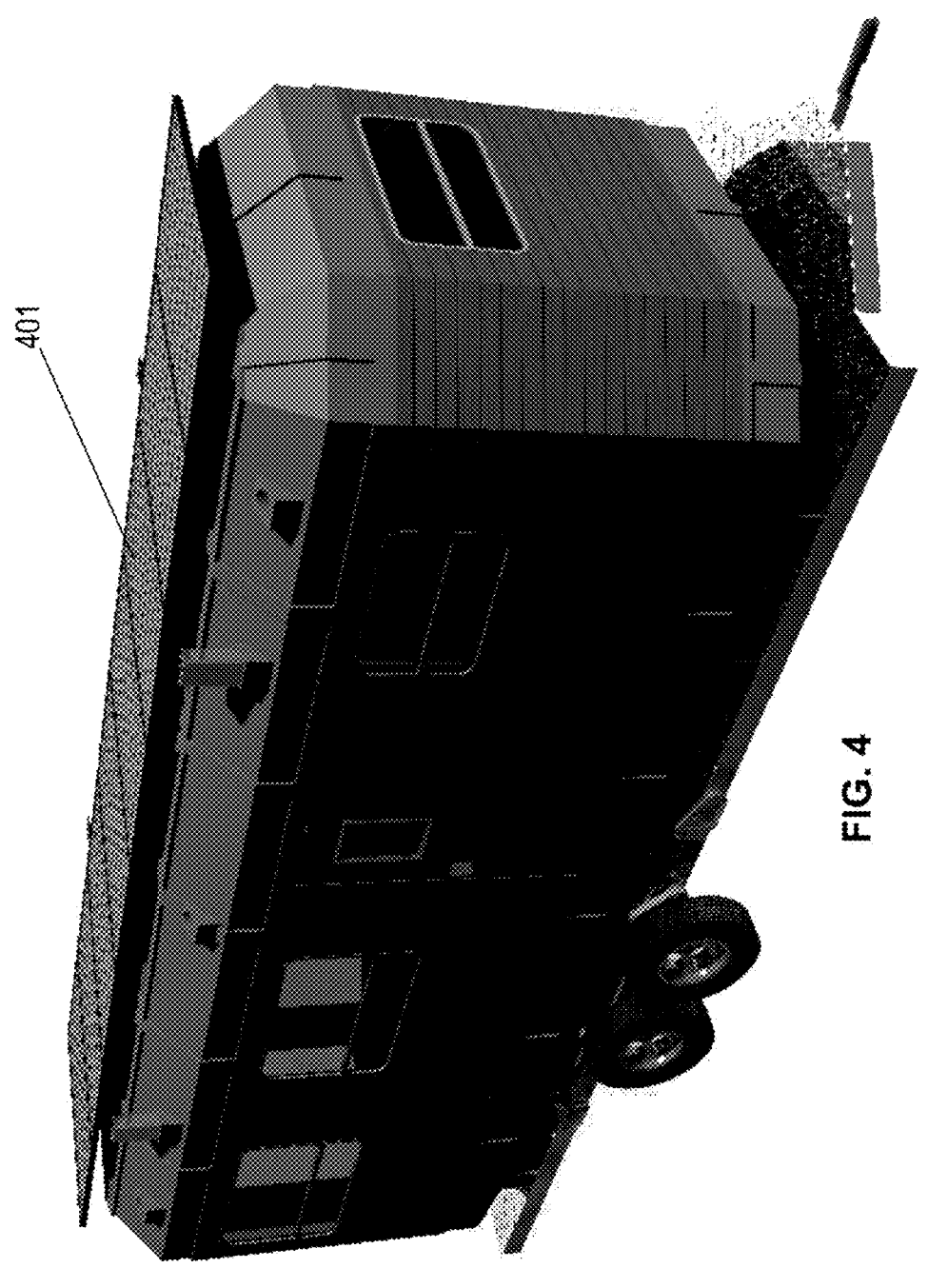
FIG. 4 depicts an embodiment of the trailer with the collapsible shell closed for use as a recreational camper.

Turning now to FIG. 4, an embodiment of the trailer 100 is shown with the collapsible shell 101 fully scoped down for use as a camper in FIG. 4. FIG. 4 additionally depicts the trailer 100 with a roof-mounted solar panel 401 for providing backup or supplementary electrical power.

Figures 5A, 5B:
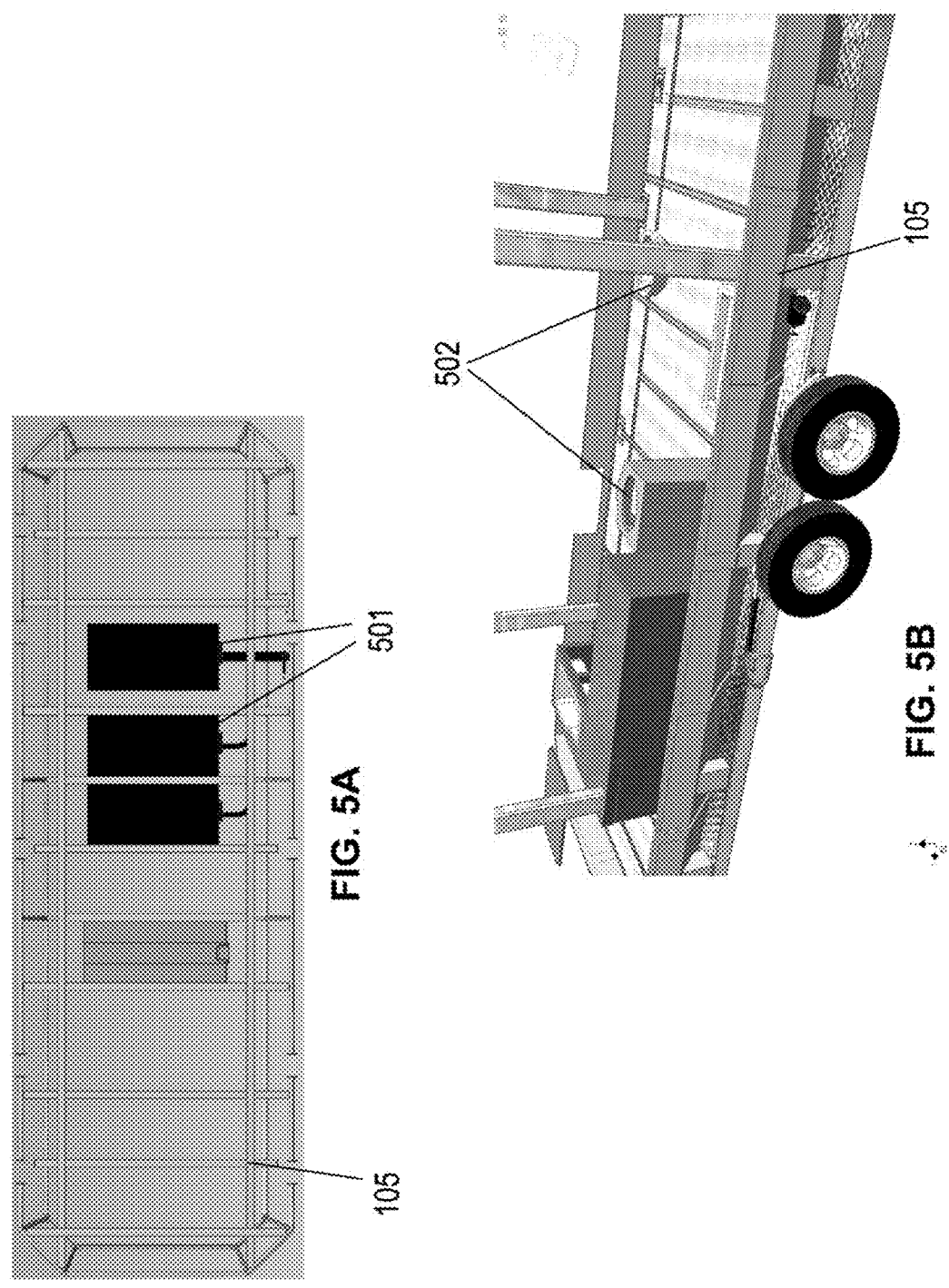
FIGS. 5A-SB depict further detail of the internal of the trailer base for use with the closed-shell camping configuration.

Turning now to FIGS. 5A and 5B, the base frame 105 is shown in overhead view with the roof cutaway for clarity. Base frame 105 houses multiple water tanks 501 which can interface with plumbing fixtures 502 such as toilets and sinks affixing to the posts 125 or tubes 135 when configured for camping.

Figures 6A, 6B:
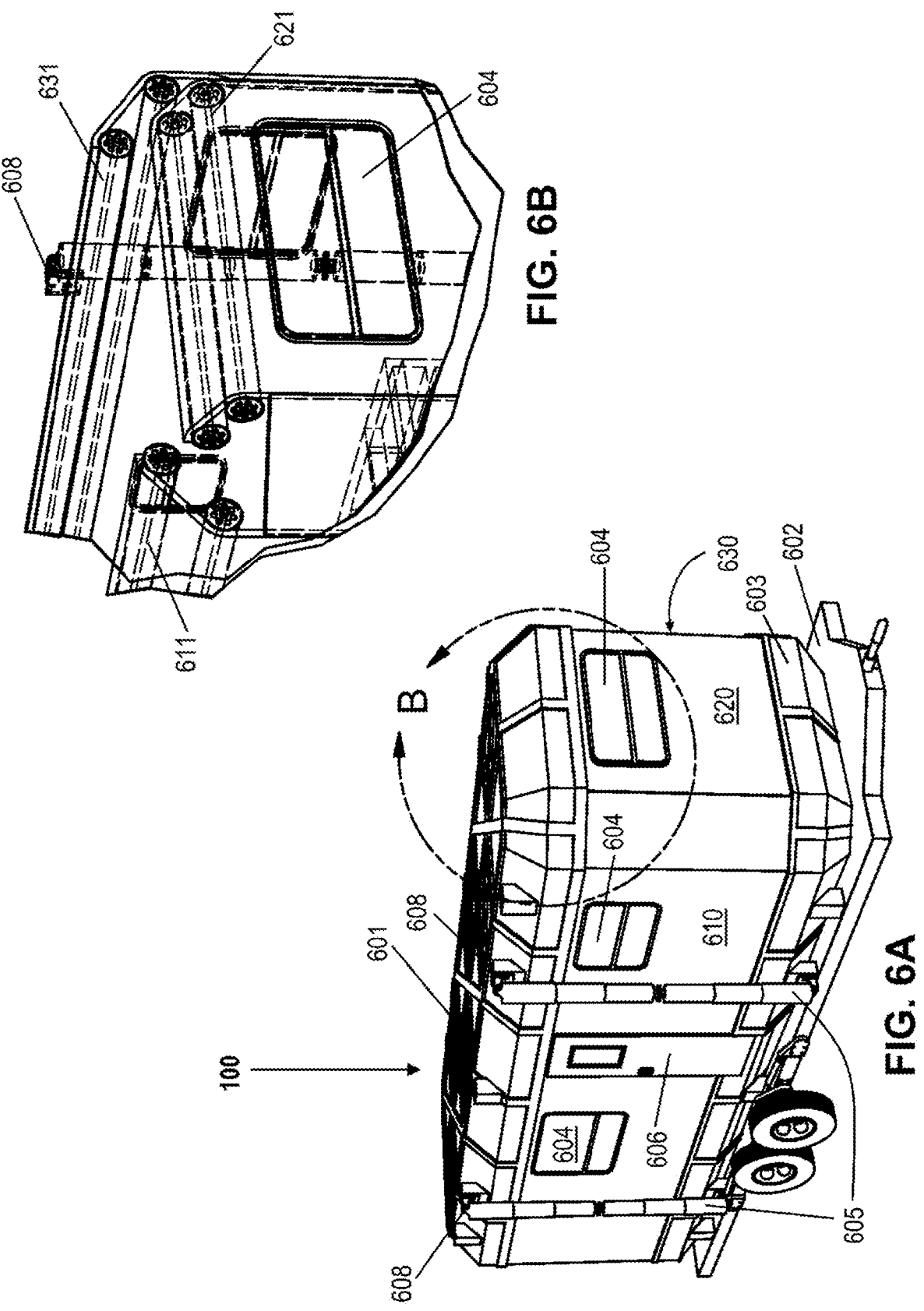
FIGS. 6A-6B depict an alternative embodiment of the trailer in which the walls are extended and retracted with a rolling mechanism.

Turning now to FIGS. 6A-6B, another embodiment of the trailer 100 is shown in perspective (FIG. 6A) and cutaway (FIG. 6B) in which the collapsible shell comprises four flexible walls 610, 620, 630 (vehicle-side wall not shown) having a corresponding roller mechanism 611, 621, 631 (vehicle-side roller not shown). The roof 601 in this embodiment is not attached directly to the walls of the trailer 100, but to support columns 605, and roller mechanisms 611, 621, 631 are in turn attached to the underside of the roof 601. A total of four support columns 605 are positioned in this embodiment (two visible in FIG. 6A, one in FIG. 6B, the fourth not visible). However, it can be appreciated embodiments with longer trailers may require more than four support columns.

These support columns 605 attach to roof mounts 608 via any suitable connection mechanism (bolts, interlocks, etc.). Support columns 605 are in turn positioned on trailer base 602, and the lower portion of the trailer 603 is attached to the bottom of the walls. Door 606 is detachable, while windows 604 roll up with the walls in a similar fashion to garage door windows.

Figures 7A, 7B:
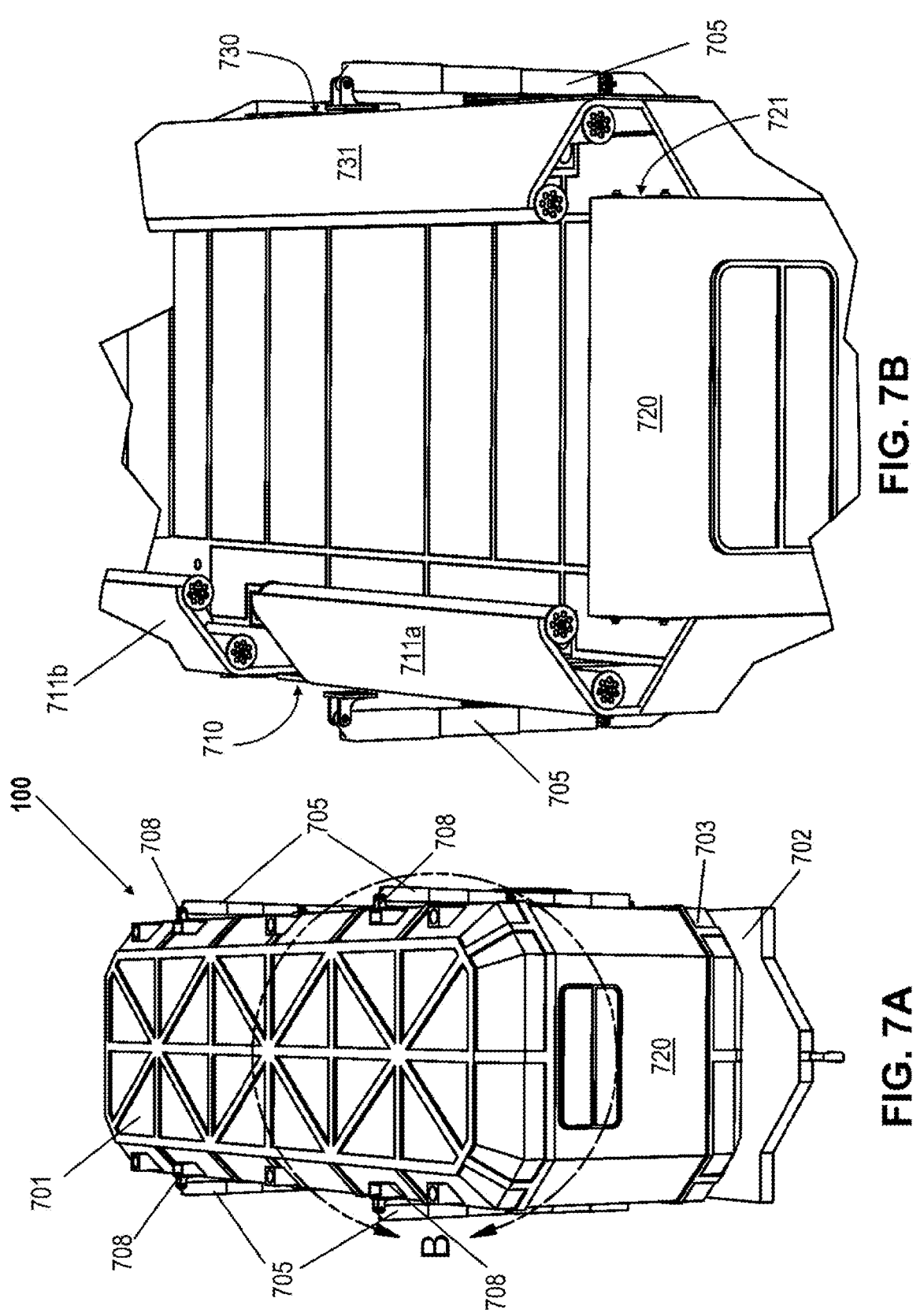
FIGS. 7A-7B depict the above embodiment at a different angle, with and without the roof, to show the rolling mechanisms with more clarity.

Turning now to FIGS. 7A-7B, another view of trailer 100 is shown in face-on view (FIG. 7A) and cutaway (FIG. 7B). The cutaway view in FIG. 7B shows the trailer 100 with roof 701 not visible for clarity. Support columns 705 extend up from the trailer base 702 exterior to the walls. As with FIGS. 6A-6B, each wall (walls 710, 720, 730 visible) is accompanied by roller mechanisms 711, 721, 731, but in this view, it can be seen that roller mechanism 711 is comprised of two separate rollers, 711a and 711b, each located on opposite side of the detachable door (not visible in this embodiment). As with the prior figure, the walls are all attached to the bottom portion of the trailer 703.

Figure 8:
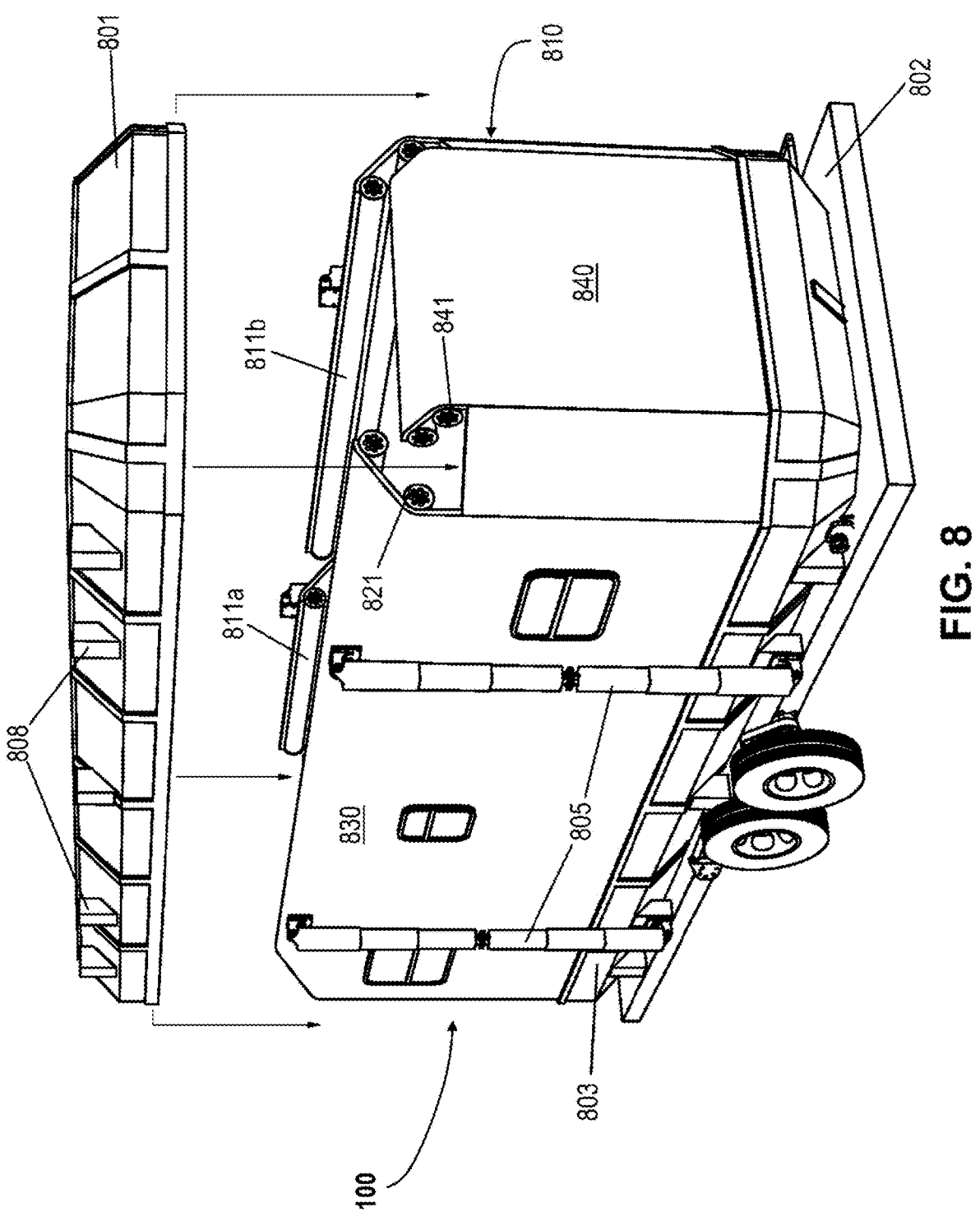
FIG. 8 depicts the above embodiment with the roof exploded from the trailer to illustrate how the roof sets on the support columns.

Turning now to FIG. 8, another view of trailer 100 is shown in rear view, with walls 810, 830, and 840 visible (820 not visible in this angle). Roof 805 is shown exploded from the rest of the trailer with the mounts 808 aligned with support columns 805 as shown by the downward-facing arrows. Rollers 811a, 811b, 831, 841 (and 821 not visible in this angle) roll their respective walls and the lower portion of the trailer 803 up from trailer base 802. Although not visible in any of the drawings, the rollers 811a, 811b, 831, 841 are positioned slightly vertically offset from one another such that the rolled-up walls stack vertically when all are fully retracted.

Figures 9A, 9B:
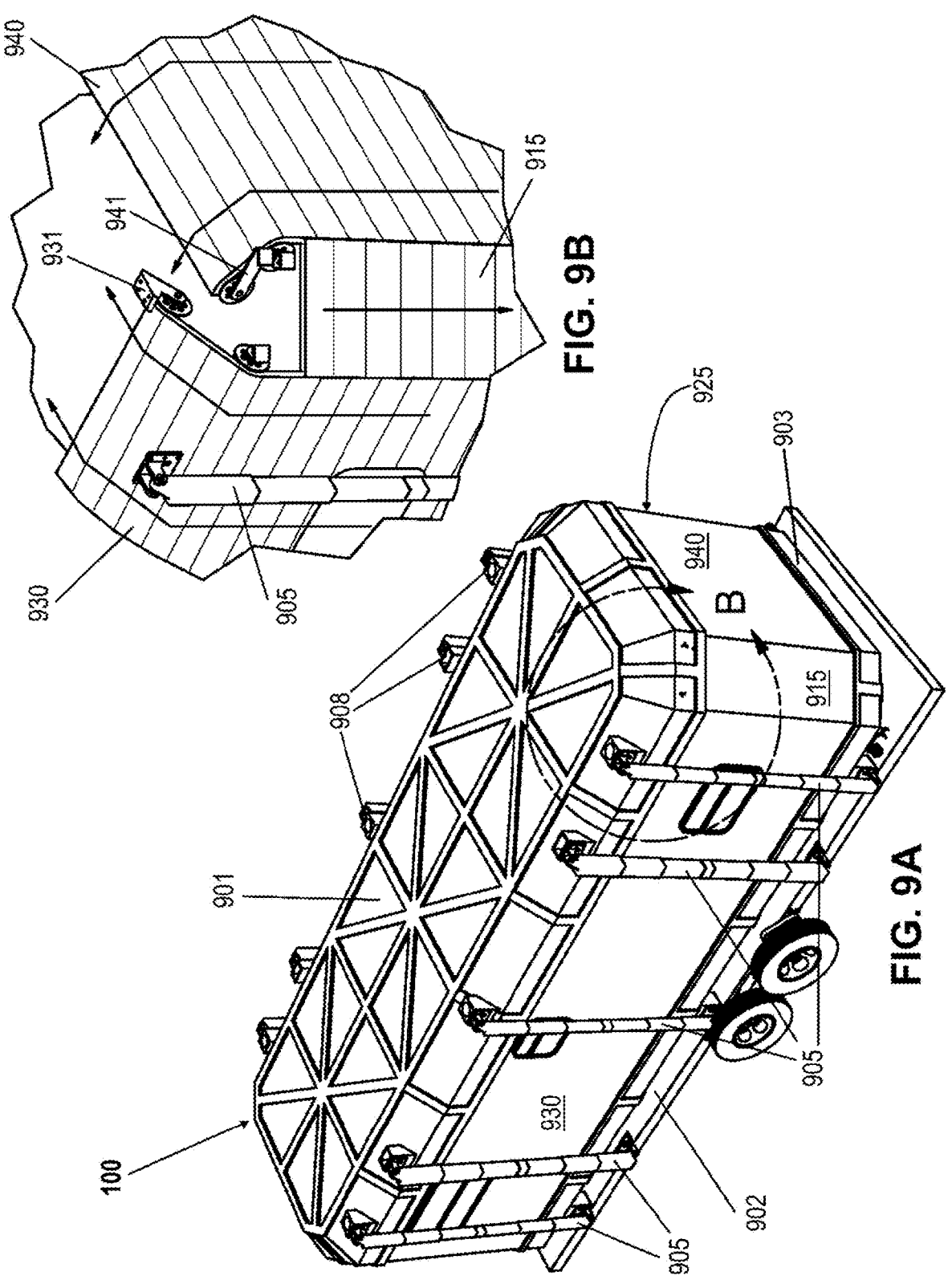
FIGS. 9A-9B depict the above embodiment with an inset showing a configuration with rolling doors which roll in opposing directions.

Turning now to FIG. 9, another view of the trailer 100 is shown from an elevated angle (FIG. 9A) and inset with the roof 901 removed (FIG. 9B). This alternative embodiment lacks the detachable door of the embodiments shown in FIGS. 6-8, instead having additional support columns 905 (five on each side instead of two). The additional roof mounts 908 (a total of ten, although only three are highlighted for clarity) each align with the support columns 905 similarly to the embodiments shown in FIGS. 6-8. This embodiment demonstrates how the inventive concept may be modified to support heavier weights, such as roof-mounted vehicles or the solar panels depicted in FIG. 4. Walls 910, 930, and 940 (920 not visible) are withdrawn using rollers 931 and 941 (911 and 921 not visible in the inset but work on similar principles) and as with other embodiments, the lower portion of trailer 903 is attached to the bottom of the walls.

In FIG. 9B, it can also be seen that in this embodiment the corner walls 915 and 925 are rolled down via similar roller mechanisms (not visible in the inset) located in the lower portion of the trailer 903. The corner walls 915, 925 (and two others not visible in this angle) interlock with the side walls 910, 930, and 940 (one not visible in this angle). However, other embodiments may be possible with variations apparent to one of ordinary skill in the art. For instance, the corner walls 915 and 925 may simply be detachable, similar to the door 603 of FIG. 6A. In such an embodiment, corner walls 915 and 925 may also be "soft" material which is simply stretched between the walls 910, 920, 930, and 940 once they are lowered, and removed before they are retracted.

Figures 10A, 10B:
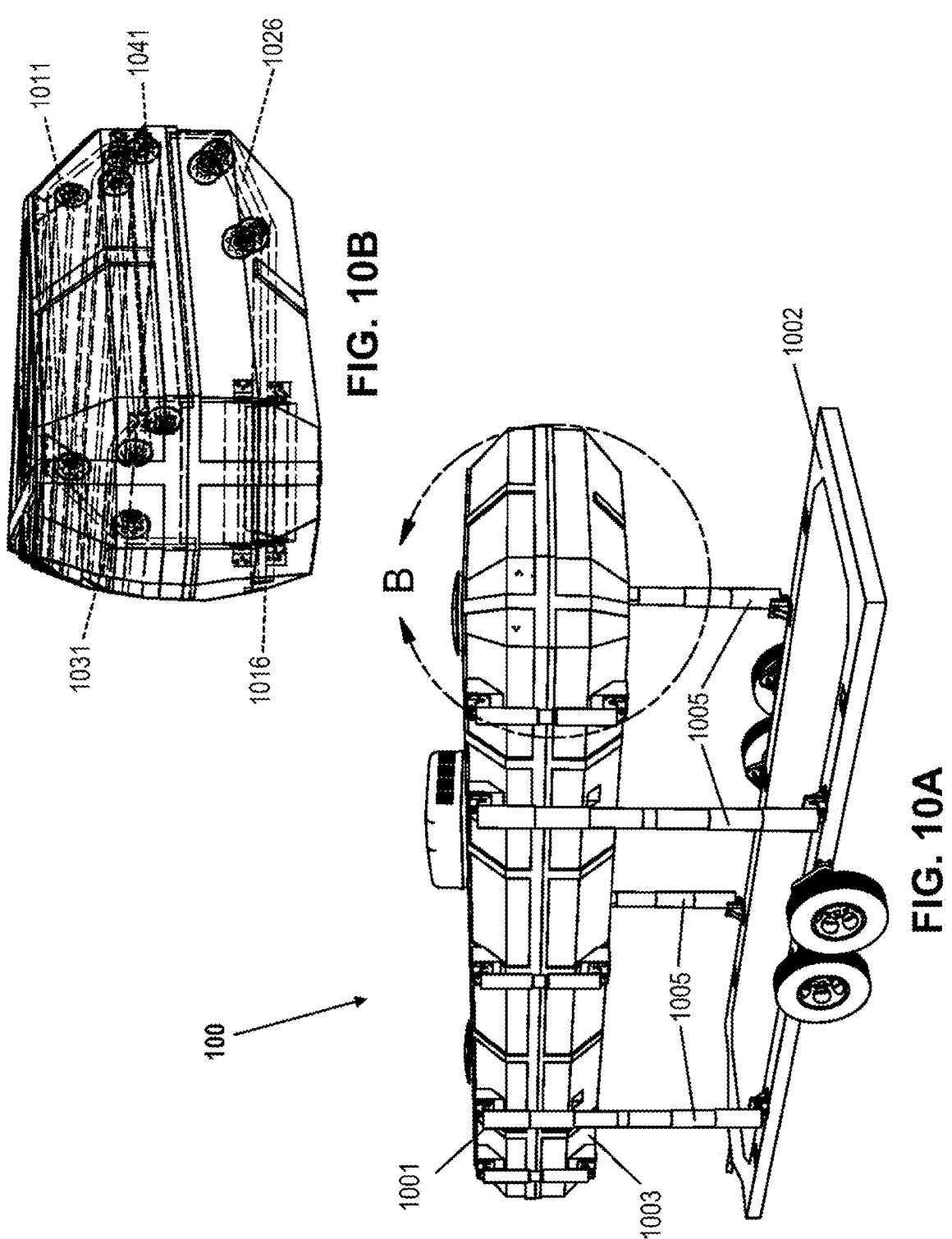
FIGS. 10A-10B depict the above embodiment with all door mechanisms fully rolled up for visibility.

Turning now to FIGS. 10A-10B, another view of the trailer 100 is shown with the walls fully retracted (and thus not labeled in the figure). The lower portion of the trailer 1003 has been raised off the trailer base 1002 by the roller mechanism until it meets the roof 1001. The walls nest in a stack, slightly vertically offset from one another, in the now-compressed interior space as shown in the FIG. 10B cutaway, which also shows the bottom-mounted roller mechanisms 1016 and 1026 corresponding to the corner walls 915 and 925 shown in FIG. 9A, respectively. The interior of the trailer 100 is now fully exposed with only the support columns 1005 remaining, similar to the embodiment depicted in FIG. 1A.

Figures 11A, 11B, 11C, 11D:
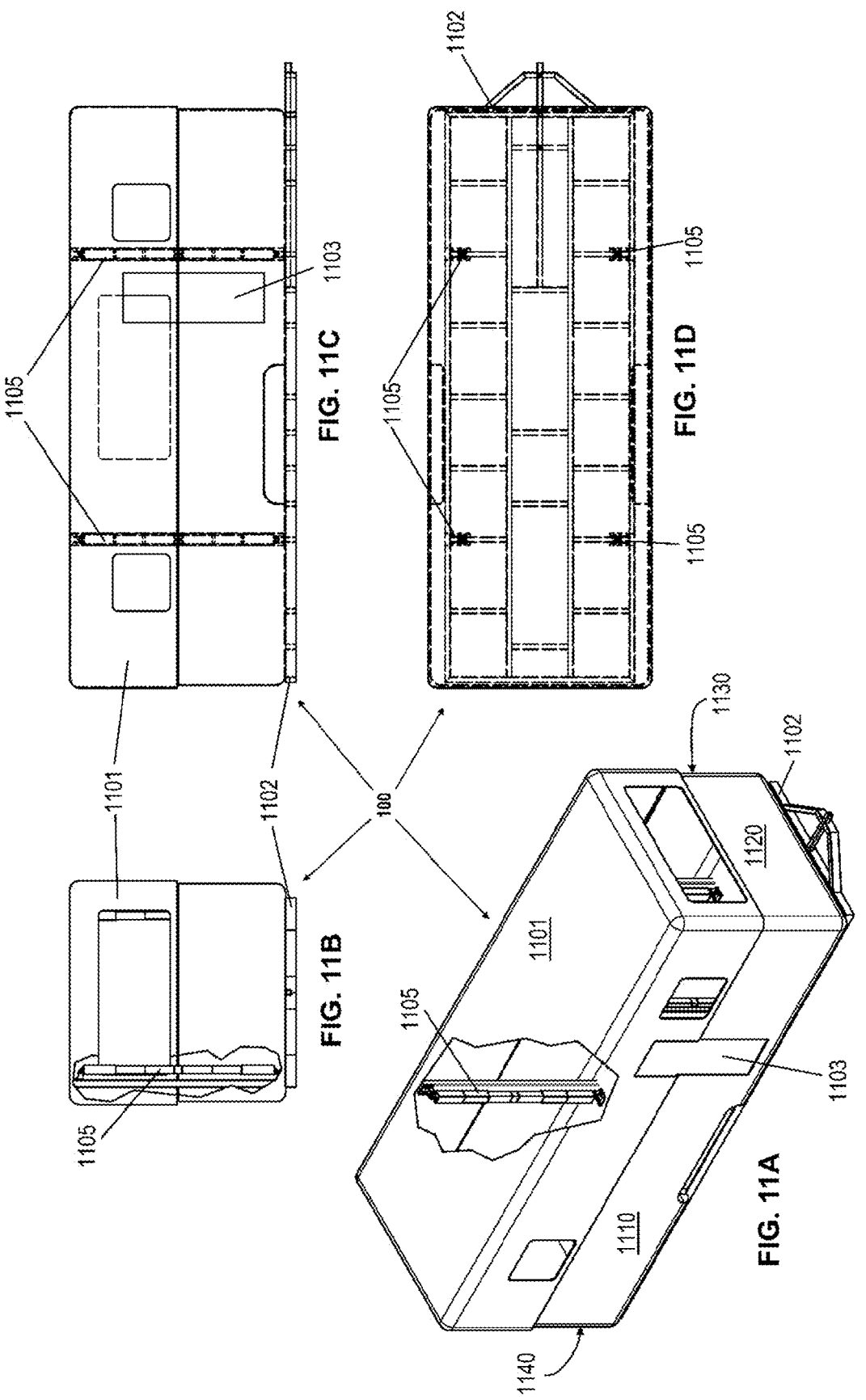
FIGS. 11A-11D depict an alternate embodiment of the trailer with the rolling mechanisms omitted and replaced by hydraulically actuated support columns.
Figures 12A, 12B, 12C, 12D, 12E, 12F:
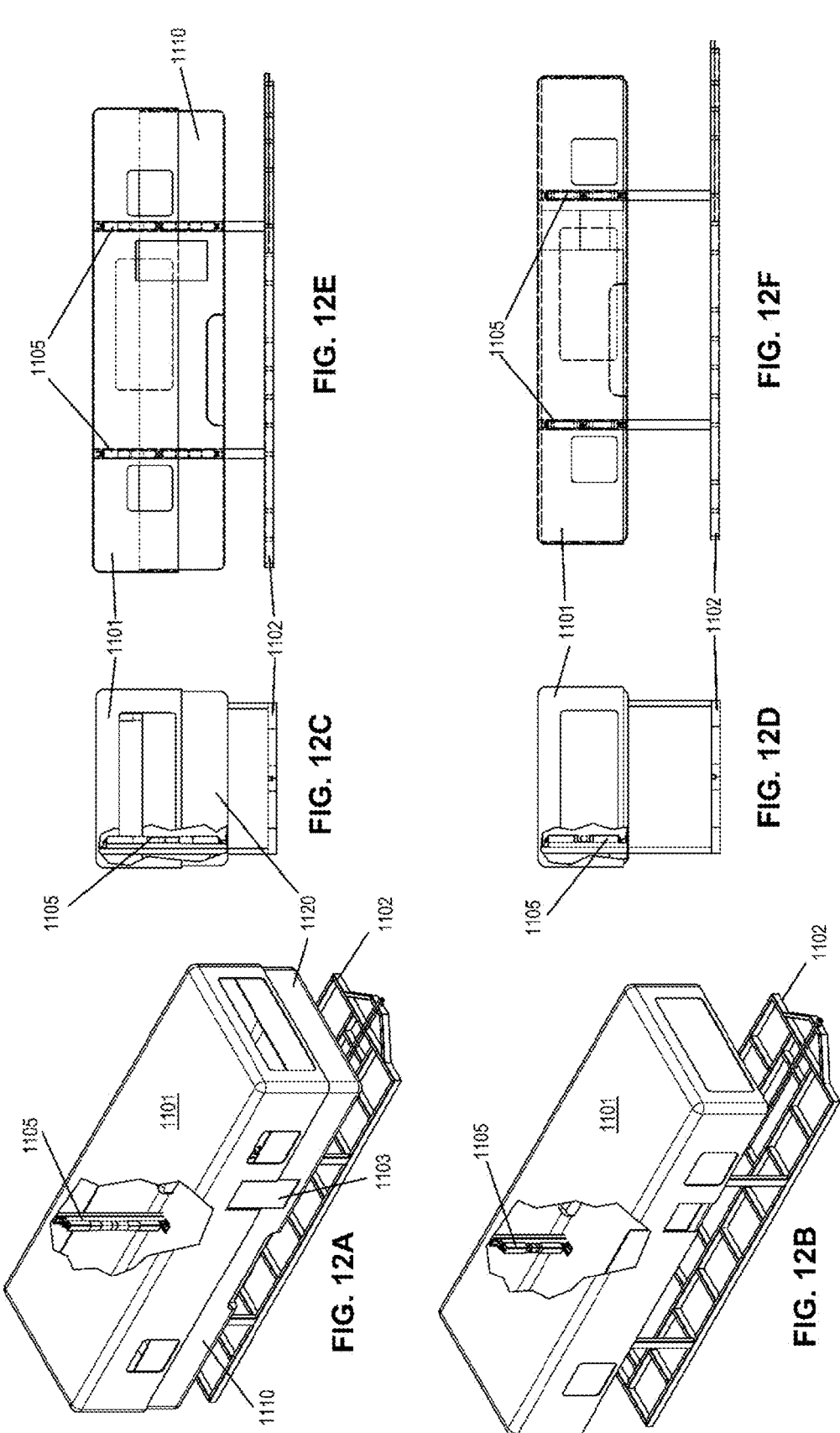
FIGS. 12A-12F depict the above embodiment in varying stages of retraction at different angles for clarity.

Turning now to FIG. 11, an alternate embodiment of the trailer 100 is shown having internal support columns 1105 which function as hydraulic cylinders. In this embodiment, the roof 1101 extends partially downward over the walls 1110, 1120, 1130, 1140, and the hydraulic cylinders raise the walls to nest within the roof and expose the base 1102 of the camper 100. A doorway 1103 is shown which may accommodate a detachable door (not shown); alternatively, this embodiment may be constructed without any doorway, similar to FIGS. 9A-9B for the roller embodiment.

Turning now to FIGS. 12A-12F, the embodiment of FIG. 11 is shown with walls 1110, 1120, 1130, and 1140 (only the first two labeled for clarity) partially (top row) and fully (bottom row) retracted. Roughly the bottom half of the camper 100 including the entirety of base 1102 is exposed when the hydraulic cylinders 1105 are fully compressed.

Other modifications of the invention may be apparent to a person of ordinary skill in the art. For instance, in an embodiment, the roof and walls may be integrally constructed such that the hydraulic cylinders lift the entire body of camper 100 off of the base by pushing the roof and walls upwards with an extending motion, rather than retracting one upwards into the other. It may also be possible to integrate the hydraulic cylinders of such an embodiment with the rolling mechanisms of the embodiment depicted in FIGS. 6-10, e.g., by having the hydraulic cylinders guide segmented walls along curved railings guiding them to the same positions as in FIG. 10B.

While various embodiments, usable within the scope of the present disclosure, have been described with emphasis and these embodiments can be practiced separately or in various combinations thereof, it should be understood that within the scope of the disclosure claims, the present invention can be practiced other than as specifically described herein.

The invention claimed is:

1. A trailer comprising:
a platform supported on the ground by a plurality of wheels;
a plurality of support columns extending upward from the platform;
an upper shell supported above the platform by the plurality of support columns;
a lower shell movable between a lower position in which the lower shell is disposed against the platform and an upper position in which the lower shell is disposed against the upper shell, wherein the upper shell and the lower shell collectively form a storage container when the lower shell is in the upper position;
a plurality of walls extending between the lower shell and the upper shell when the lower shell is in the lower position, wherein the walls, the lower shell, and the upper shell collectively define a living space, wherein the lower shell forms a floor of the living space and the upper shell forms a roof of the living space, wherein the walls are configured to be rolled, and wherein the walls are disposed in the storage container when the lower shell is in the upper position; and
a plurality of roller mechanisms disposed within the upper shell, wherein the roller mechanisms are configured to roll up the walls, wherein lower ends of at least some of the walls are connected to the lower shell, and wherein the roller mechanisms are configured move the lower shell from the lower position to the upper position when the roller mechanisms roll up the walls.

2. The trailer of claim 1, wherein the support columns comprise hydraulic cylinders.

3. The trailer of claim 1, wherein the platform and the lower shell define an empty space therebetween when the lower shell is in the upper position, and wherein the platform is configured to support thereon at least one of a vehicle and a boat.

4. The trailer of claim 1, wherein the lower shell comprises a plurality of passages extending vertically therethrough, and wherein each of the passages is configured to accommodate therethrough a corresponding one of the support columns.

5. The trailer of claim 1, further comprising a plurality of fixtures disposed within the lower shell, wherein the fixtures are disposed within the storage container when the lower shell is in the upper position.

6. The trailer of claim 5, wherein the fixtures comprise at least one of plumbing fixtures and furniture.

7. The trailer of claim 1, wherein the platform comprises a first interface for supplying at least one of electricity and plumbing to the trailer, wherein the lower shell comprises a second interface for supplying at least one of electricity and plumbing to the trailer, and wherein the first interface and the second interface are configured to connect when the lower shell is in the lower position.

8. A trailer comprising:
a platform supported on the ground by a plurality of wheels;
a plurality of support columns extending upward from the platform;
an upper shell supported above the platform by the plurality of support columns;
a lower shell movable between a lower position in which the lower shell is disposed against the platform and an upper position in which the lower shell is disposed against the upper shell, wherein the upper shell and the lower shell collectively define a storage space when the lower shell is in the upper position;
a plurality of walls configured to extend between the lower shell and the upper shell when the lower shell is in the lower position, wherein the walls are configured to be rolled, wherein the walls, the lower shell, and the upper shell collectively define a living space, and wherein the lower shell forms a floor of the living space and the upper shell forms a roof of the living space; and
a plurality of roller mechanisms disposed within the upper shell, wherein the roller mechanisms are configured to roll up the walls, wherein lower ends of at least some of the walls are connected to the lower shell, and wherein the roller mechanisms are configured move the lower shell from the lower position to the upper position when the roller mechanisms roll up the walls.

9. The trailer of claim 8, wherein the upper shell and the lower shell collectively form a storage container defining the storage space when the lower shell is in the upper position, and wherein the walls are configured to be stored in the storage space of the storage container when the lower shell is in the upper position.

10. The trailer of claim 8, wherein the platform and the lower shell define an empty space therebetween when the lower shell is in the upper position, and wherein the platform is configured to support thereon at least one of a vehicle and a boat.

11. The trailer of claim 8, wherein the lower shell comprises a plurality of passages extending vertically therethrough, and wherein each of the passages is configured to accommodate therethrough a corresponding one of the support columns.

12. The trailer of claim 8, further comprising a plurality of fixtures disposed within the lower shell, wherein the fixtures are disposed within the storage container space when the lower shell is in the upper position.

13. The trailer of claim 12, wherein the fixtures comprise at least one of plumbing fixtures and furniture.

14. The trailer of claim 8, wherein the platform comprises a first interface for supplying at least one of electricity and plumbing to the trailer, wherein the lower shell comprises a second interface for supplying at least one of electricity and plumbing to the trailer, and wherein the first interface and the second interface are configured to connect when the lower shell is in the lower position.

* * * * *